US007285928B1

(12) United States Patent
Jolly et al.

(10) Patent No.: US 7,285,928 B1
(45) Date of Patent: Oct. 23, 2007

(54) CONTAINER FOR USE WITH FLEXIBLE BAGS

(76) Inventors: David M. Jolly, 5552 Huddleston St., Haltom City, TX (US) 76137; Glyndel Jolley, 613 Globe Ave., Blue Mound, TX (US) 76131

( * ) Notice: Subject to any disclaimer, the term of this patent is extended or adjusted under 35 U.S.C. 154(b) by 0 days.

(21) Appl. No.: 11/254,255

(22) Filed: Oct. 19, 2005

(51) Int. Cl.
*H02P 3/20* (2006.01)

(52) U.S. Cl. ...................... 318/280; 318/281; 318/139; 220/908.1; 220/661; 220/495.01

(58) Field of Classification Search ..................... None
See application file for complete search history.

(56) References Cited

U.S. PATENT DOCUMENTS 4,294,379 A 10/1981 Bard
4,690,045 A * 9/1987 Badger ........................ 99/485
4,890,760 A 1/1990 Nicoll, Sr. et al.
5,020,186 A * 6/1991 Lessig et al. ................. 15/339
5,375,732 A 12/1994 Bowers et al.
5,388,717 A 2/1995 Le Vasseur
5,492,241 A 2/1996 Barnett et al.
D398,117 S 9/1998 Giba
6,015,063 A 1/2000 Poliquin
6,814,249 B2 * 11/2004 Lin ........................... 220/87.1
2004/0175303 A1 * 9/2004 Lin ......................... 422/186.3
2005/0126405 A1 * 6/2005 Imperato .................... 100/240

FOREIGN PATENT DOCUMENTS

JP 01252401 A * 10/1989
JP 02081804 A * 3/1990
JP 05124707 A * 5/1993

* cited by examiner

*Primary Examiner*—Lincoln Donovan
*Assistant Examiner*—Renata McCloud

(57) ABSTRACT

A container includes a fan that is reversible so air can be removed from the container as a flexible bag is placed into the container and ambient air can be forced into the container when the flexible bag is being removed from the container. This will facilitate placement and removal of a flexible bag in and from the container.

5 Claims, 1 Drawing Sheet

CONTAINER FOR USE WITH FLEXIBLE BAGS

BACKGROUND OF THE INVENTION

1. Field of the Invention

The present invention relates to the general art of containers, and to the particular field of trash containers.

2. Background of the Invention

Conventionally, trash or other refuse material is collected and bagged in a flexible plastic liner placed within a rigid, upstanding receptacle. Typically, in residential and commercial trash collection, however, it has been observed that the plastic liner due to its flexible nature tends to cling to the inside wall of the trash receptacle, and as the trash liner is progressively filled with refuse material, the liner further clings to the trash receptacle wall and ultimately substantially fills the space defined by the receptacle wall. During this process, any air present between the liner and the receptacle wall slowly leaks out, and when the trash-filled liner occupies the interior space of the receptacle, a vacuum is created between the trash liner and the receptacle wall and the receptacle base portion lying beneath the liner. Accordingly, when a user lifts the trash liner, the suction pressure due to the vacuum counteracts removal of the trash liner. In this manner, trash can liners can become stuck within a trash can by the vacuum seal created when the trash can liner contacts the sidewalls of the trash can. When this happens it can be difficult, particularly for weak and infirm individuals, to physically pull the trash can liner out of the trash can. In some cases, pulling a bag against such a vacuum may even tear the bag.

An additional problem occurs when filling a flexible, collapsible trash liner which is mounted within a trash receptacle in that the air trapped between the flexible, collapsible trash liner and the interior walls of the trash receptacle prevents the flexible, collapsible trash liner from assuming a ready full configuration. This entrapped air prevents the bag liner from assuming its fullest possible configuration within the receptacle and, thereby, limits the amount of trash that can be held without manual adjustment.

While the art contains many examples of trash containers that have vents, vents are of limited expediency. Vents can become clogged and thus lose their effectiveness. Still further, a vent must be built large enough to accommodate all contingencies, thereby making it over-large for some applications.

INVENTION SUMMARY

This invention is generally directed a container that is suitable for use with flexible bags, such as trash bags, and which includes a fan that is reversible to draw ambient air into the container or to remove air from the container. The fan has a motor and switches that are operated by foot pedals.

Using the container embodying the present invention will permit a user to remove air from the container as a flexible bag is being placed into the container whereby the bag will be easily placed into the container and will be able to be fully available for receiving material; and to draw air into the container while the flexible bag is being removed whereby a vacuum will not be created to impede removal of the flexible bag from the container.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 2:
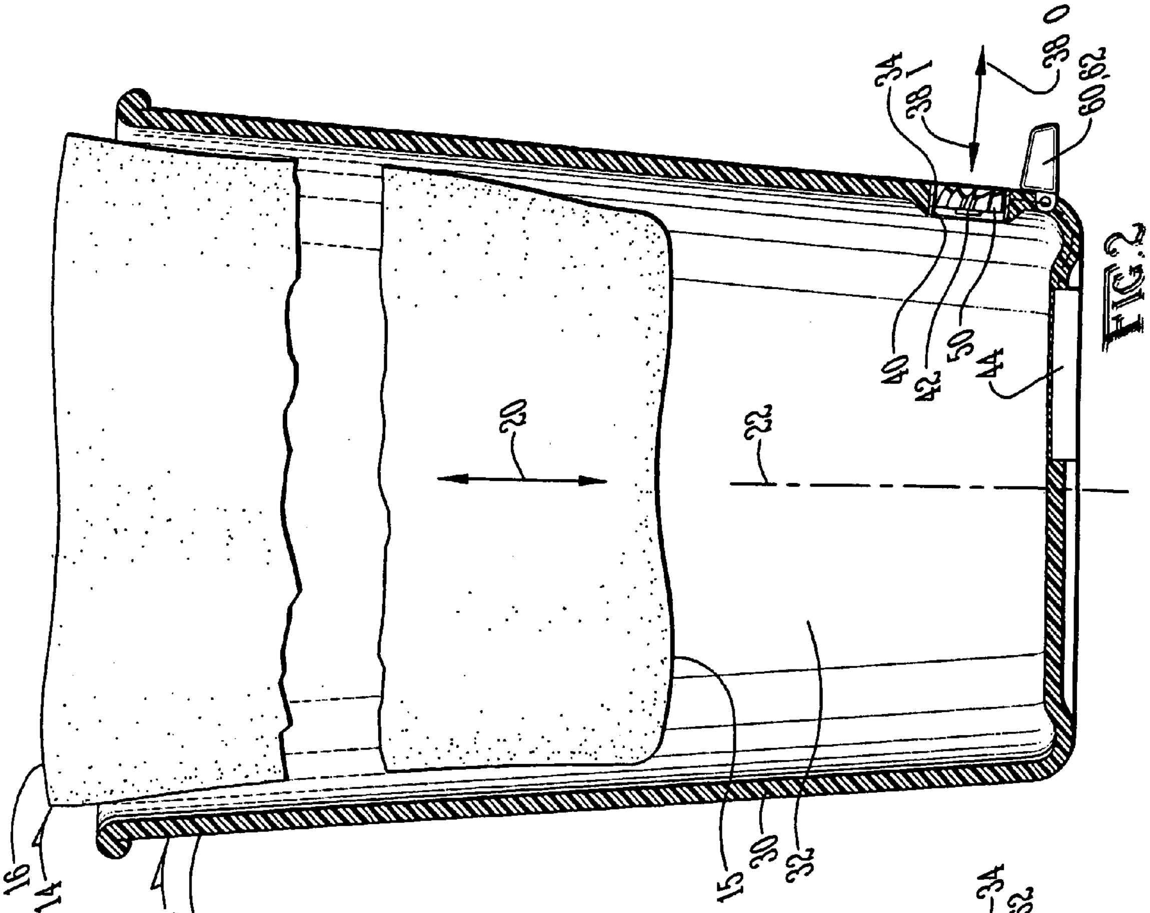
FIG. 2 is a schematic showing the container embodying the present invention.
Figure 1:
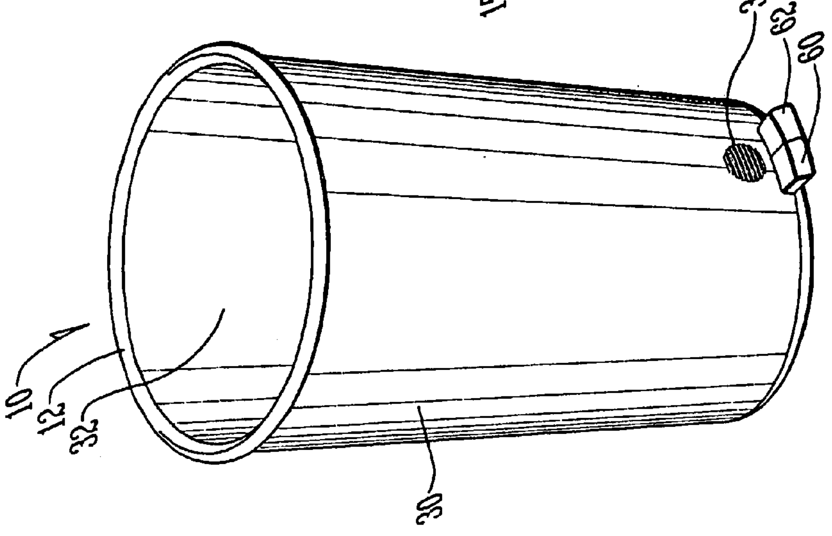
FIG. 1 is a perspective view of a container embodying the present invention.

FIG. 1 shows a container 10 including a shell 12 which is adapted to accommodate a flexible bag, such as a flexible trash bag 14, or the like. Shell 12 includes a first end 14 which is a bottom end when shell 12 is in use. As can be understood from FIG. 2, first end 14 is closed. A second end 16 is a top end when shell 12 is in use and is open so the bag can be placed into the container and removed as indicated by double-headed arrow 20. A longitudinal axis 22 extends between first end 14 and second end 16 and the bag moves in the direction of the longitudinal axis when being placed into the container and being removed from the container.

A wall 30 connects first end 14 to second end 16 and is preferably cylindrical, but could be other shapes as well without departing from the scope of this disclosure. Wall 30 and first end 14 define an interior volume 32 of shell 12. As can be understood from FIG. 2, the flexible bag is accommodated in interior volume 32. A vent port 34 is defined in the wall adjacent to first end 14 and provides a path through which air flows in directions 38I and 38O indicated by double-headed arrow 38.

A motor housing 40 is mounted in first end 14 adjacent to vent port 34, and a motor 42 is located in the motor housing. Motor 42 is of the type that is reversible and which is adapted to be connected to a source of power, such as a battery 44 or the like. The details of the reversible motor are not important to the present invention and thus will not be discussed. Those skilled in the art will be able to select a standard reversible motor that fulfills the requirements of the container embodying the present invention based on the teaching of the present disclosure.

A fan blade 50 is mounted on motor 42 to be rotated thereby and is located to be in fluid connection with vent port 34 and in fluid connection with interior volume 32 of shell 12 whereby air is removed (in direction 38O) from the interior volume of the shell via the vent port when the motor is operated in a first direction and ambient air is drawn into the interior volume of the shell (in direction 38I) via the vent port when the motor is operated in a second direction.

A first switch 60 is mounted on wall 30 of the shell and is electrically connected to the motor to cause the motor to operate in the first direction when switch 60 is activated. A second switch 62 is mounted on the wall of the shell and is electrically connected to the motor to cause the motor to operate in the second direction when switch 62 is activated. In the form of the container shown, switches 60 and 62 are located to be operated by a user's foot. However, other switches can be used without departing from the scope of the present invention.

Operation of container 10 can be understood from the foregoing disclosure and thus will not be presented in detail. A bag, such as bag 14 is placed in the shell of the container to receive trash. As bag 14 is forced into the container shell, the fan is operated via one of the switches 60 or 62 to move air out of the container in direction 38O via vent port 34 to ensure proper setting of the bag in the shell. Once the bag is full, it is removed from the shell by first operating the other switch of the switches 60 and 62 to draw ambient air into the shell in direction 38I via vent port 34 to remove any vacuum that might be created when the bag is being removed from the shell. In this manner, the bag is initially set into the shell in a manner which ensures that the bag will be fully set and fully able to accommodate material and will be easily removed without hindrance of a vacuum.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A container for use with flexible bags comprising:

A) a shell which is adapted to accommodate a flexible bag, such as a flexible trash bag, and which includes (1) a first end which is a bottom end when said shell is in use, the first end being closed, (2) a second end which is a top end when said shell is in use, the second end being open, (3) a longitudinal axis which extends between the first end and the second end, and (4) a wall which connects the first end to the second end;

B) a vent port defined in the wall adjacent to the first end, the wall and the first end defining an interior volume of said shell and in which the flexible bag is accommodated;

C) a motor housing mounted in the first end adjacent to said vent port;

D) a motor in said motor housing, said motor being reversible and which is adapted to be connected to a source of power;

E) a fan blade mounted on said motor to be rotated thereby and being located to be in fluid connection with said vent port and in fluid connection with the interior volume of said shell whereby air is removed from the interior volume of said shell via said vent port when said motor is operated in a first direction and ambient air is drawn into the interior volume of said shell via said vent port when said motor is operated in a second direction;

F) a first switch mounted on the wall of said shell and electrically connected to said motor to cause said motor to operate in the first direction when activated; and G) a second switch mounted on the wall of said shell and electrically connected to said motor to cause said motor to operate in the second direction when activated.

2. The container defined in claim 1 wherein the source of power is a battery.

3. A container for use with flexible bags comprising:

A) a shell adapted to accommodate a flexible bag, the shell having (1) a first end which is a bottom end when said shell is in use, the first end being closed, (2) a second end which is a top end when said shell is in use, the second end being open, (3) a longitudinal axis which extends between the first end and the second end, and (4) a wall which connects the first end to the second end;

B) a vent port defined in the wall adjacent to the first end, the wall and the first end defining an interior volume of said shell and in which the flexible bag is accommodated;

C) a motor housing mounted in the first end adjacent to said vent port;

D) a motor in said motor housing, said motor being reversible and which is adapted to be connected to a source of power; and E) a fan blade mounted on said motor to be rotated thereby and being located to be in fluid connection with said vent port and in fluid connection with the interior volume of said shell whereby air is removed from the interior volume of said shell via said vent port when said motor is operated in a first direction and ambient air is drawn into the interior volume of said shell via said vent port when said motor is operated in a second direction.

4. The container defined in claim 3, including a first switch mounted on the wall of said shell and electrically connected to said motor to cause said motor to operate in the first direction when activated.

5. The container defined in claim 3, including a second switch mounted on the wall of said shell and electrically connected to said motor to cause said motor to operate in the second direction when activated.

* * * * *